(12) United States Patent
Sari et al.

(10) Patent No.: US 8,191,375 B2
(45) Date of Patent: Jun. 5, 2012

(54) DEVICE FOR GENERATING COLD AND HEAT BY A MAGNETO-CALORIFIC EFFECT

(75) Inventors: Osmann Sari, Prilly (CH); Peter W. Egolf, Niederlenz (CH); Stefano Bozzini, Corzoneso (CH)

(73) Assignee: Haute Ecole d'Ingenierie et de Gestion du Canton de Vaud ( Heig-VD), Yverdon-les-Bains (CH)

( * ) Notice: Subject to any disclaimer, the term of this patent is extended or adjusted under 35 U.S.C. 154(b) by 891 days.

(21) Appl. No.: 12/097,134

(22) PCT Filed: Dec. 12, 2006

(86) PCT No.: PCT/CH2006/000691
§ 371 (c)(1),
(2), (4) Date: Sep. 22, 2008

(87) PCT Pub. No.: WO2007/068134
PCT Pub. Date: Jun. 21, 2007

(65) Prior Publication Data
US 2009/0151363 A1 Jun. 18, 2009

(30) Foreign Application Priority Data
Dec. 13, 2005 (CH) ...................................... 1969/05

(51) Int. Cl.
*F25B 21/00* (2006.01)
*F25B 21/02* (2006.01)
(52) U.S. Cl. ................................. 62/3.1; 62/3
(58) Field of Classification Search .................. 62/3, 3.1, 62/3.7, 6, 324.2, 335, 434, 467
See application file for complete search history.

(56) References Cited

U.S. PATENT DOCUMENTS

| | | | | |
|---|---|---|---|---|
| 4,033,734 A | * | 7/1977 | Steyert et al. | 62/3.1 |
| 4,107,935 A | * | 8/1978 | Steyert, Jr. | 62/3.1 |
| 4,332,135 A | * | 6/1982 | Barclay et al. | 62/3.1 |
| 4,441,325 A | * | 4/1984 | Bon-Mardion et al. | 62/3.1 |
| 4,457,135 A | | 7/1984 | Hakuraku et al. | |
| 4,507,927 A | * | 4/1985 | Barclay | 62/467 |
| 4,532,770 A | * | 8/1985 | Hakuraku et al. | 62/3.1 |
| 4,589,953 A | * | 5/1986 | Nakagome et al. | 216/22 |
| 4,625,519 A | * | 12/1986 | Hakuraku et al. | 62/3.1 |
| 4,674,288 A | | 6/1987 | Kuriyama et al. | |

(Continued)

FOREIGN PATENT DOCUMENTS
EP 1 135 999 9/2001
(Continued)

*Primary Examiner* — Frantz Jules
*Assistant Examiner* — Emmanuel Duke
(74) *Attorney, Agent, or Firm* — Davis & Bujold, P.L.L.C.

(57) ABSTRACT

A device (10) for continuously generating cold and heat by a magnetic effect. The device includes a magnetic field generator (13), which is arranged in at least one crown segment and defines an annular space crossed by a circular coaxial part (11) provided with radial transverse cavities (31) and contains at least one type of magneto-calorific material. The inventive device also includes a circulating pump (27) for axially supplying a heat carrier to the cavities (31). A first collector (33) picks up the heat carrier, which passes through the radial cavities (31) in the area containing the magnetic field generator (13), and a second collector (34) picks up the heat carrier which passes through the radial cavities (31) in an area located outside of the magnetic field generator (13).

12 Claims, 8 Drawing Sheets

U.S. PATENT DOCUMENTS

| | | | |
|---|---|---|---|
| 4,727,721 A * | 3/1988 | Peschka et al. | 62/3.1 |
| 4,727,722 A * | 3/1988 | Kirol | 62/3.1 |
| 5,024,059 A * | 6/1991 | Noble | 62/3.1 |
| 5,231,834 A | 8/1993 | Burnett | |
| 6,668,560 B2 * | 12/2003 | Zimm et al. | 62/3.1 |
| 2002/0040583 A1* | 4/2002 | Barclay et al. | 62/3.1 |
| 2002/0053209 A1* | 5/2002 | Zimm et al. | 62/3.1 |
| 2007/0130960 A1 | 6/2007 | Muller et al. | |
| 2008/0078184 A1* | 4/2008 | Saito et al. | 62/3.1 |

FOREIGN PATENT DOCUMENTS

| | | |
|---|---|---|
| FR | 2 517 415 | 6/1983 |
| FR | 2 525 748 | 10/1983 |
| FR | 2 548 339 | 1/1985 |
| FR | 2 586 793 | 3/1987 |
| FR | 2 861 454 | 4/2005 |
| WO | 03/016794 | 2/2003 |
| WO | 03/050456 | 6/2003 |
| WO | 2004/059221 | 7/2004 |
| WO | 2004/059222 | 7/2004 |

\* cited by examiner

US 8,191,375 B2

DEVICE FOR GENERATING COLD AND HEAT BY A MAGNETO-CALORIFIC EFFECT

This application is a national stage completion of PCT/CH2006/000691 filed Dec. 12, 2006 which claims priority from Swiss Application Serial No. 1969/05 filed Dec. 13, 2005.

TECHNICAL FIELD

The present invention concerns a device for generating cold and heat by a magnetic effect, which comprises at least one generator of a magnetic field arranged in at least one crown segment and defines an annular space through which there passes a coaxial circular element, the element being provided with radial transverse cavities and containing at least one magneto-calorific material, the radial transverse cavities being arranged to convey a heat-carrying fluid in contact with the magneto-calorific material.

PRIOR ART

Conventional devices for generating cold usually comprise a compressor for compressing a refrigerant fluid in order to raise its temperature, and expansion means for decompressing the refrigerant fluid in order to cool it. It has been shown that the refrigerants currently used are extremely polluting and that their use entails risks of serious atmospheric pollution. Consequently, these refrigerants no longer satisfy the current requirements relating to the protection of the environment.

Devices that use the magneto-calorific effect to generate cold are already known. In particular, the U.S. Pat. No. 4,674,288 describes an apparatus for liquefying helium, which comprises a substance that can be magnetized which moves in a magnetic field generated by a coil and a reservoir containing helium in heat-conducting contact with the coil. The translational movement of the magnetizable substance generates cold, which is transmitted to the helium via conducting elements.

The object of the publication FR 2 525 748 is a magnetic refrigeration device comprising a magnetizable material, a system for generating a variable magnetic field and means for transferring heat and cold that consists of a chamber filled with a saturated liquid refrigerant. The magnetizable material generates cold at a position where the cold-transferring means extract the cold from the magnetizable material by the condensation of a refrigerant, and the magnetizable material generates heat at another position where the heat-transferring means extract the heat from the magnetisable material by boiling another refrigerant.

The publication FR 2 586 793 concerns a device comprising a substance intended to produce heat when it is magnetized and to produce cold when it is demagnetized, with means for generating a variable magnetic field, the magnetic field generation means comprising a superconducting coil and a reservoir containing an element to be cooled.

U.S. Pat. No. 5,231,834 describes a device for heating and cooling by a magnetic effect, in which a magnetic liquid is pumped through the system. The liquid passes through a magnetic field generated by superconducting or other magnets. When the liquid enters the magnetic field it is heated by virtue of the magnetization.

Such systems have extremely low efficiency and cannot be used for domestic applications. Consequently, they cannot compete with the current refrigeration systems.

The international publications WO 2004/059221 and WO 2004/059222 concern a method and device for generating cold and heat by a magneto-calorific effect. The first publication describes a device comprising a rotating element through which a heat-carrying fluid passes in a direction parallel to its rotation axis. This design is bulky and can only be used with difficulty for the industrial production of compact equipment having a simple and economical structure that enables easy maintenance.

The object of the publication FR 2 517 415 is a method and device for refrigeration in which a support carrying a paramagnetic substance is moved by a mechanical/magnetic system in a cryostat in the shape of a torus. This support is acted upon by a magnetic field induced either by electromagnets or by permanent magnets positioned on either side of the magnetic support. In this design the magnetic circuit is open and the magnetic field lines close up outside the system, which entails substantial magnetic induction that requires a large consumption of energy when electromagnets are used. In addition, the use of electromagnets result in losses due to the Joule effect, which it is absolutely necessary to dissipate in order to ensure proper operation at the Curie temperature of gadolinium. The use of permanent magnets does not allow this system to operate because they would have to be more powerful than any currently available on the market. Moreover, the fact that the magnetic circuit is not closed in on itself can give rise to substantial magnetization leaks and it would be necessary to provide magnetic isolation which would considerably increase the production cost of the device. This is not the case with the device according to the present invention, in which there is no magnetic field leakage since the magnetic circuit is closed in on itself and all the magnetic field is concentrated in the magneto-calorific materials.

The device described in the publication FR 2 861 454 is a magnetic flux generating device comprising a ring which carries radially magnetic means, which pivots one way and the other on its axis. This configuration increases the energy absorbed by the system, because a larger mass has to be moved due to the rotation of the magnets. The device of the present invention does not suffer from that disadvantage, since the mass of its magnets is fixed.

The international publication WO 03/050456 describes a magnetic refrigeration device which uses two permanent magnets which are moved continually in rotation so that they sweep different compartments, containing gadolinium in powder form, of a monoblock annular chamber in which they are subjected in succession to a zero and non-zero magnetic field. To operate, this device requires very precise synchronous rotation of the magnets. It is a system which is technically difficult and costly to construct and which, like the device described in the publication previously cited, demands high energy consumption because of the rotation of the masses of the magnets which are heavier than the mass of gadolinium.

In the system proposed in the U.S. Pat. No. 4,727,721 the magnets, arranged in one or two opposed pairs, produce alternating irregular forces which result in an elevated energy consumption to maintain the rotation of the system. These alternating forces can generate vibrations and hence more rapid wear, and noise. In addition, the fact that two heat-carrying fluids are circulated increases the complexity of the system and hence its production and operating costs, along with a risk of breakdowns due to the possibility of joint failure caused by wear. In the device of the present invention the mountings are arranged side by side, which generates a movement with very little vibration because the force is practically continuous. Consequently energy consumption is reduced, there is less wear and noise is virtually absent. Furthermore, the fact that there is only one heat-carrying fluid dispenses with the need for a complex sealing system.

EXPLANATION OF THE INVENTION

The present invention proposes to overcome the disadvantages of the known systems by providing a cooling device which does not use polluting refrigerants and therefore does not have the disadvantages of the previous systems. In addition, the system of the present invention can be made as a simple and economic structure, suitable for industrial production and giving a device that occupies little space and is efficient and economical in operation.

This objective is achieved by a device as defined in the preamble and characterized in that it also comprises:
- means for introducing the heat-carrying fluid in an axial direction into the coaxial circular element,
- means for introducing the heat-carrying fluid along a radial direction into the transverse radial cavities,
- the means for introducing the heat-carrying fluid in an axial direction into the coaxial circular element and the means for introducing the heat-carrying fluid in a radial direction into the transverse cavities comprising at least one fluid circulating element arranged so as to circulate the heat-carrying fluid,
- at least one second collector arranged so as to receive the heat-carrying fluid after it has passed through the transverse radial cavities in a zone located outside the magnetic field generator.

Advantageously, the device comprises means arranged in such manner that it forms a unit arranged so that it is associated in series with an identical unit in order to form a device with greater power.

The heat-carrying fluid may be a gas, and in that case the heat-carrying fluid is a fan.

The heat-carrying fluid may also be a liquid and in that case the heat-carrying fluid circulator is a pump.

In a preferred embodiment the magnetic field generator is fixed and the coaxial circular element comprising the radial transverse cavities is rotated about its axis by a drive motor mounted coaxially with respect to the coaxial circular rotating element.

The magnetic field generator is advantageously in the shape of a semicircular crown and comprises a steel core with a U-shaped cross-section in which permanent magnets are held so as to form a closed magnetic field.

The device preferably comprises a supporting mechanical assembly with a fixed inner bell arranged coaxially inside a rotating outer bell coupled to the drive motor, the rotating coaxial element being attached to the rotating outer bell.

Advantageously, the fixed inner bell and the rotating outer bell are connected via ball bearings.

In the preferred embodiment the fixed inner bell and the rotating outer bell form the connection elements of two units.

In all the embodiments the supporting mechanical assembly comprises essentially a plate, a belt, a fixed table and the fixed inner bell.

Preferably, the device comprises a lower cylinder which, together with the belt and the fixed table, defines a lower space.

Advantageously, the lower space is divided mainly by three essentially radial partitions and forms the means for introducing the heat-carrying fluid in an axial direction into the coaxial circular element.

The magnetic field generator can consist of an even number of magnetic crown segment elements, the crown segments of each of the pairs of elements being arranged symmetrically with respect to the axis of the magnetic field generator.

Preferably, the elements in the form of crown segments of one and the same pair respectively generate magnetic fields of inverted polarity.

BRIEF DESCRIPTION OF THE DRAWINGS

The present invention will be better understood and its advantages emerge more clearly from the following description of various embodiments illustrated in the attached drawings, in which.

METHOD(S) OF IMPLEMENTING THE INVENTION

Figure 1:
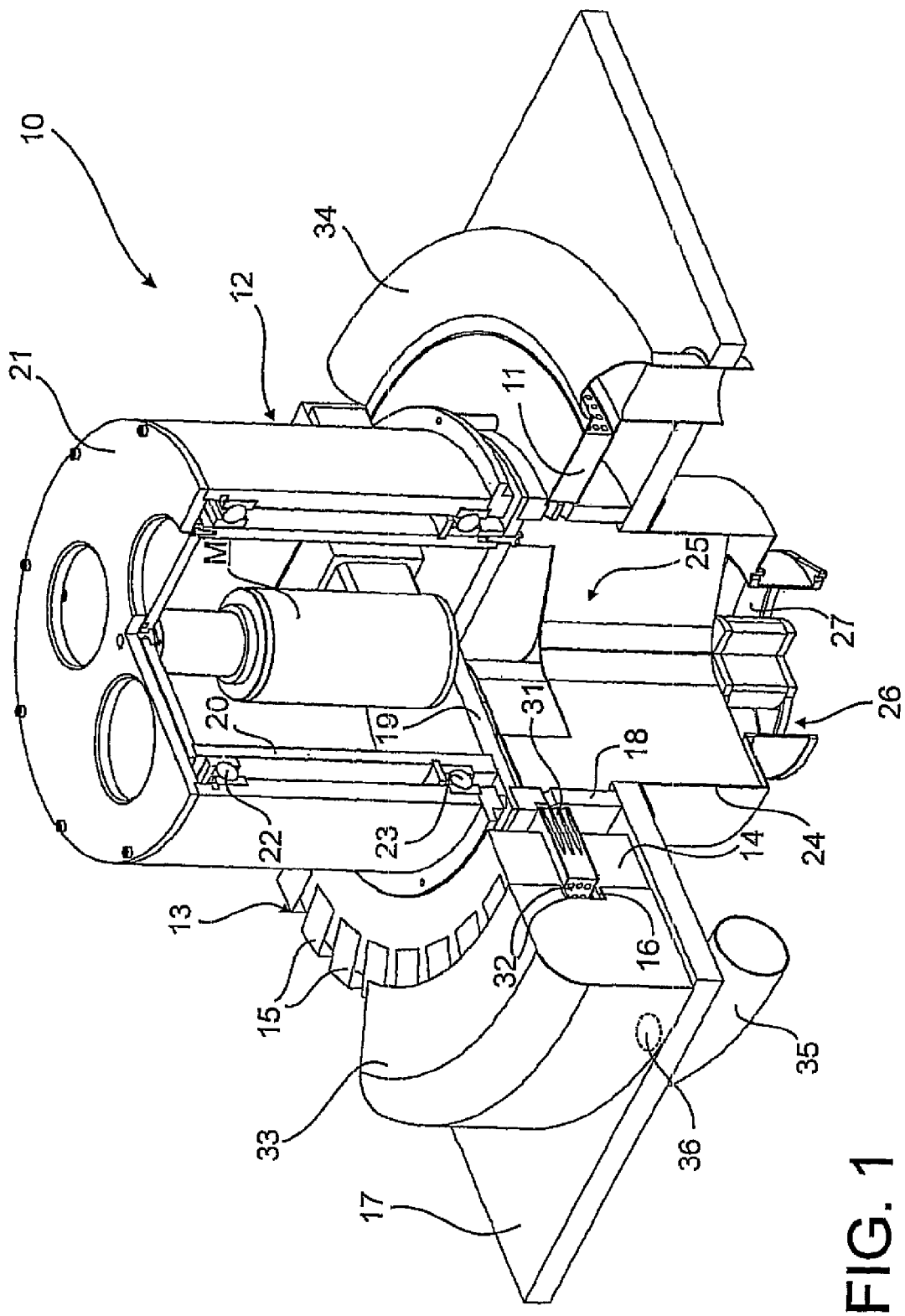
FIG. 1 shows a schematic perspective view of a first embodiment of the device according to the invention for generating cold and heat by a magneto-calorific effect.
Figure 2:
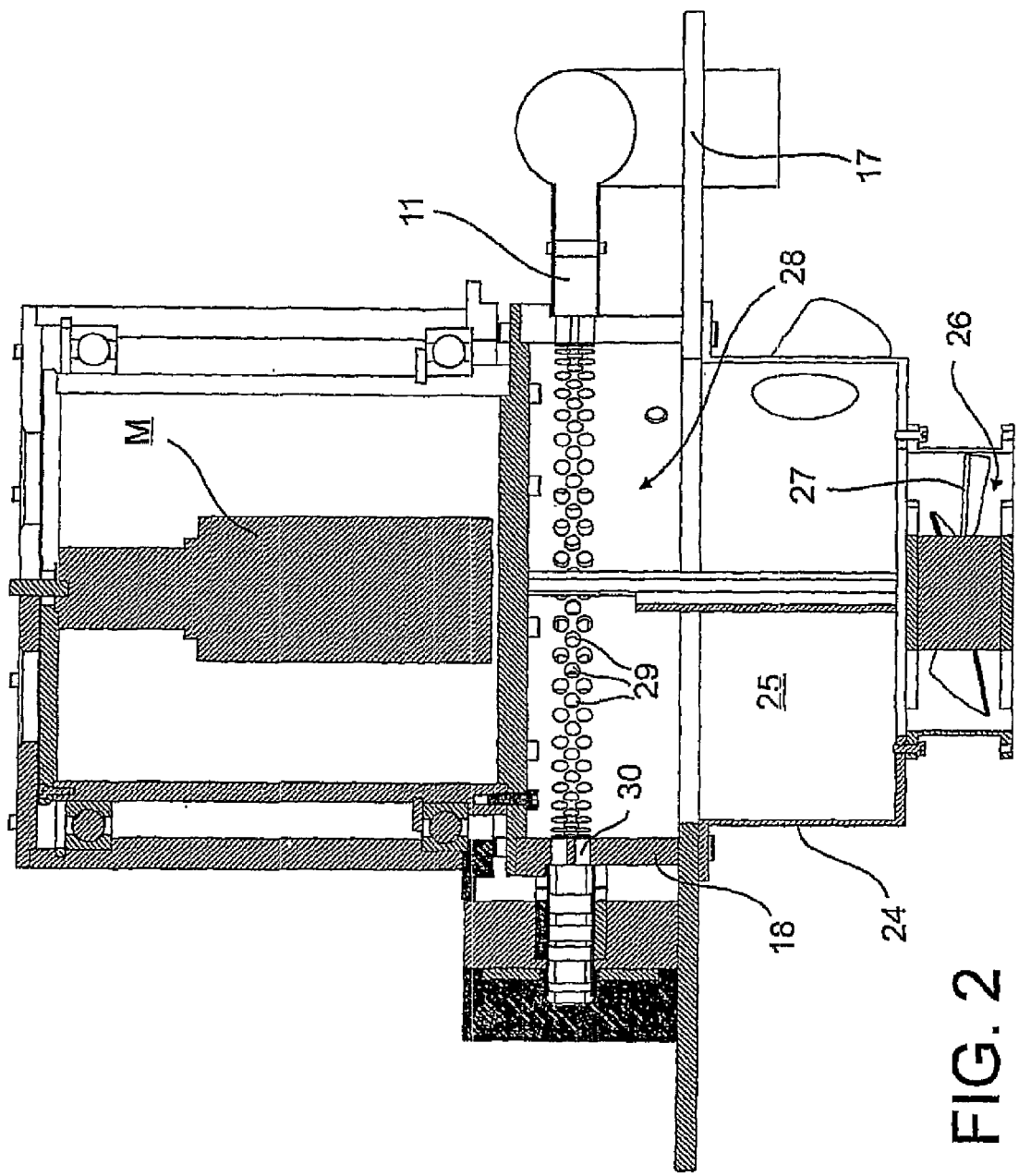
FIG. 2 shows an axial cross-section of the device in FIG. 1.
Figure 3:
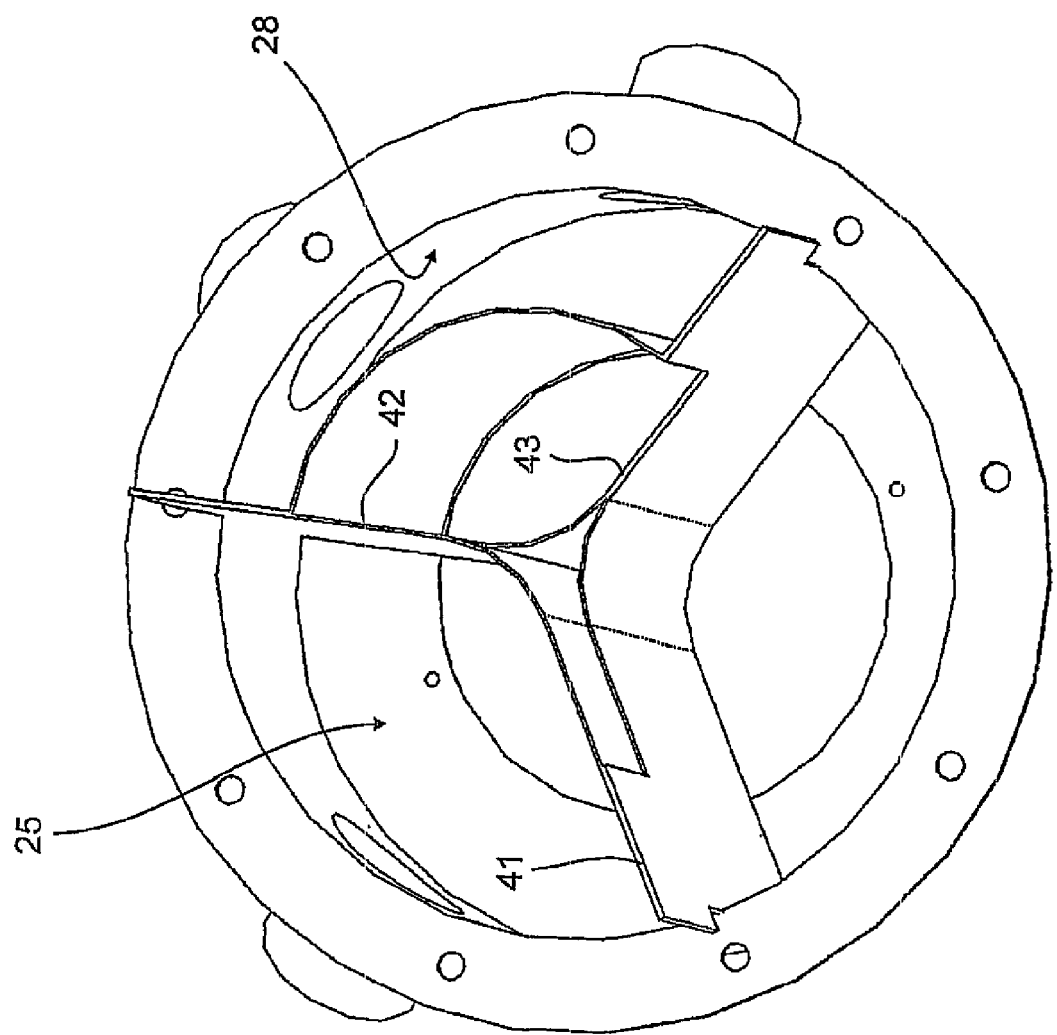
FIG. 3 shows a perspective partial view from below, illustrating the structure of the means for introducing the heat-carrying fluid.

Referring to FIGS. 1 to 3 which correspond to a first embodiment of the device according to the invention, this device 10 consists mainly of a coaxial circular element 11 containing a magneto-calorific material, mounted on a mechanical supporting assembly 12 and driven in rotation about its axis through a magnetic field generated by a fixed magnetic field generator 13. In the design example illustrated, the fixed magnetic field generator 13 is in the form of a semicircular crown having a core 14 consisting of a block of magnetizable steel with the general shape of a U, in which magnets 15, preferably high-power permanent magnets are held. This design could be modified by a symmetrical structure in which the block of magnetizable steel in the form of a half-crown is replaced by two blocks of magnetizable steel corresponding to quarter-circle segments and arranged two by two symmetrically, or to segments whose dimensions correspond to a sixth or an eighth of a circle, again arranged two by two symmetrically. Such a structure is shown as an example by FIGS. 8A and 8B. The core 14 has an air gap 16 in which is engaged the coaxial circular element 11 which, in this design, can rotate. The space between the periphery of the coaxial circular element 11 and the adjacent walls of the core 14 is very small and essentially constant. In principle it should not exceed 0.5 mm, which implies a very precise and very rigid construction of the rotating coaxial element 11 and the supporting mechanical assembly 12. In this case the magnetic field generator 13 is fixed and mounted on a rigid plate 17 of the supporting mechanical assembly 12.

The rotating coaxial element 11 rotates outside a belt 18 mounted on a fixed table 19 located at the base of a fixed inner bell 20 arranged coaxially inside a rotary outer bell 21 coupled to a drive motor M. The fixed inner bell 20 and the rotating outer bell 21 are joined by two ball bearings 22 and 23. The supporting mechanical assembly 12 comprises essentially the plate 17, the belt 18, the fixed table 19 and the fixed inner bell 20. The drive motor M is mounted between the fixed table 19 and the top of the rotating outer bell 21. Together with the belt 18 and the fixed table 19, a lower cylinder 24 delimits a lower space 25 which is shown in more detail in FIG. 3 and communicates with the exterior surroundings via a central opening 26 in which a circulator 27 is mounted. The lower space 25 extends beyond the plate 17 of the supporting mechanical assembly 12 essentially as far as the fixed table 19 and, as shown more precisely in FIG. 2, a cylindrical sidewall 28 delimits the chamber close to the rotating coaxial element 11, which is perforated by a plurality of holes 29 opposite passages 30 made in the belt 18.

FIG. 3 shows the inside of the lower space 25 delimited by the cylindrical sidewall 28 in greater detail. This space is divided mainly by three essentially radial partitions 41, 42 and 43 designed to direct the air flows generated by the circulator 27. It should be noted that the air, which in the example represented is the gas that constitutes the heat-carrying fluid required to transport the heat and cold generated by the magneto-calorific device of the invention, is moved by a fan which constitutes the circulator. This heat-carrying fluid could also be a liquid which, in that case would be moved by a pump forming the circulator.

The rotating coaxial element is provided with a plurality of transverse radial cavities 31 partially or totally filled with a magneto-calorific material, for example in the form of an accumulation of spherical pellets, the cavities opening, via peripheral orifices 32, on the one hand into a collector of hot fluid 33 that surrounds the semicircular crown of the magnetic field generator 13, and on the other hand into a collector of cold fluid 34 arranged in the zone in which the rotating coaxial element 11 rotates outside the air gap 16 of the core 14 of the magnetic field generator 13. The hot fluid collector communicates with a hot fluid duct 35 fixed to the plate 17 of the supporting mechanical assembly 12, through openings 36 made in the plate 17.

Figure 4:
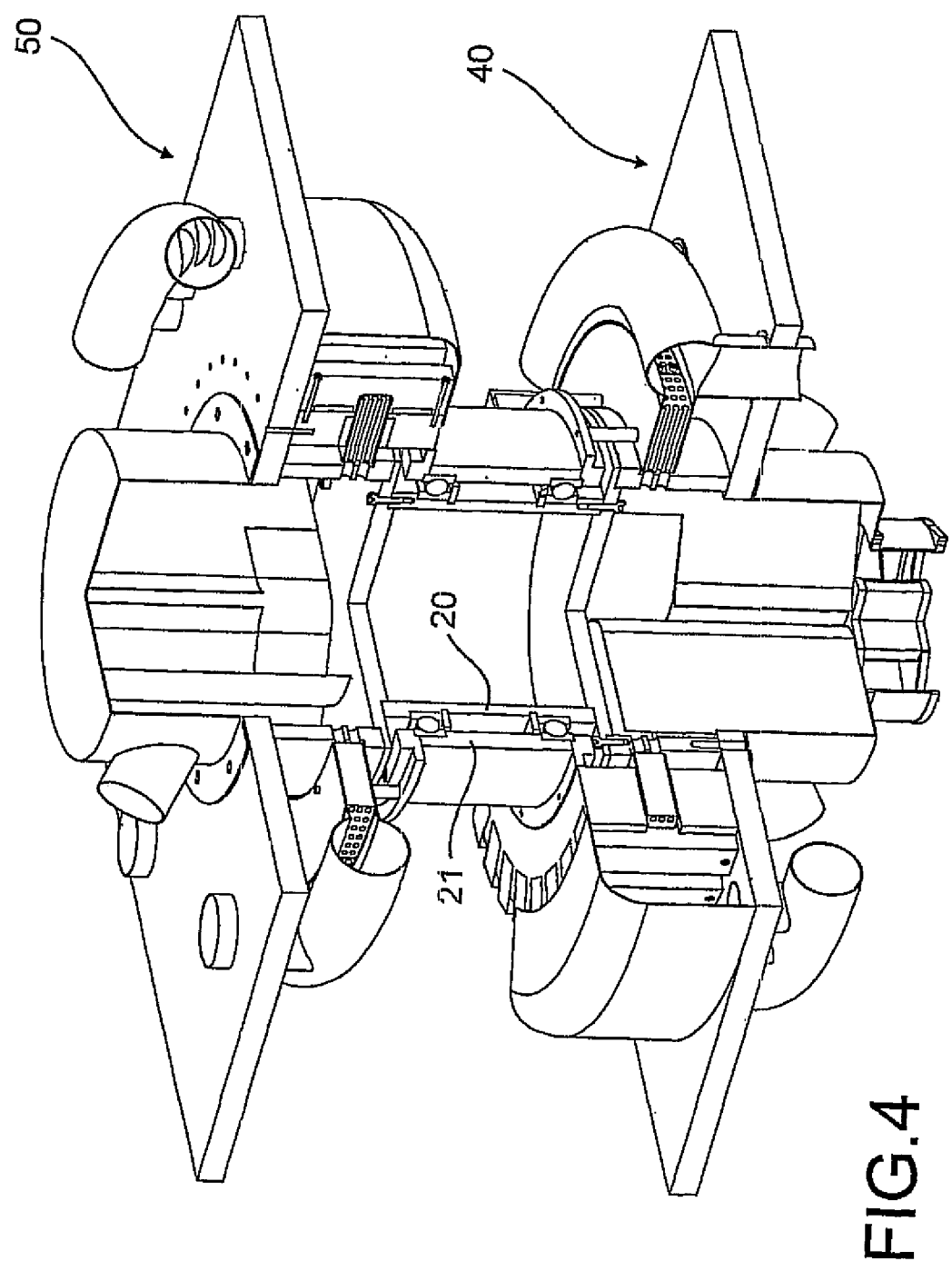
FIG. 4 shows a perspective view of a second embodiment of the device according to the invention for generating cold and heat by a magneto-calorific effect, which comprises two units similar to the device of FIG. 1, mounted in series in order to increase the efficiency of the system.

FIG. 4 shows two units 40 and 50, respectively similar to the device of FIGS. 1 and 2, these units being mounted in series to increase the efficacy of the device which is then said to be a two-stage device. The components of this device, which are similar to those described and shown in FIG. 1, are given the same index numbers. Each of the units 40 and 50 comprises mainly a rotating coaxial element 11 containing a magneto-calorific material, mounted on a supporting mechanical assembly 12 and driven in rotation about its axis through a magnetic field generated by a magnetic field generator 13. In the example embodiment represented, the magnetic field generator 13 is in the form of a semicircular crown comprising a core 14 consisting of a block of magnetizable steel having the general shape of a U and in which a series of magnets 15, preferably high-power permanent magnets, are held. The core 14 has an air gap 16 in which the rotating coaxial element 11 is engaged.

It should be noted that the unit 50 is rotated relative to the unit 40 in such manner that the rotating inner bell 20 and the fixed outer bell 21, which contains the rotating inner bell 20, are common to the two units.

The invention is not limited to a two-stage device. Other, additional units could be mounted in series on the two units 40 and 50, the purpose of such an arrangement being to increase the efficacy and power of the device.

Figure 5A:
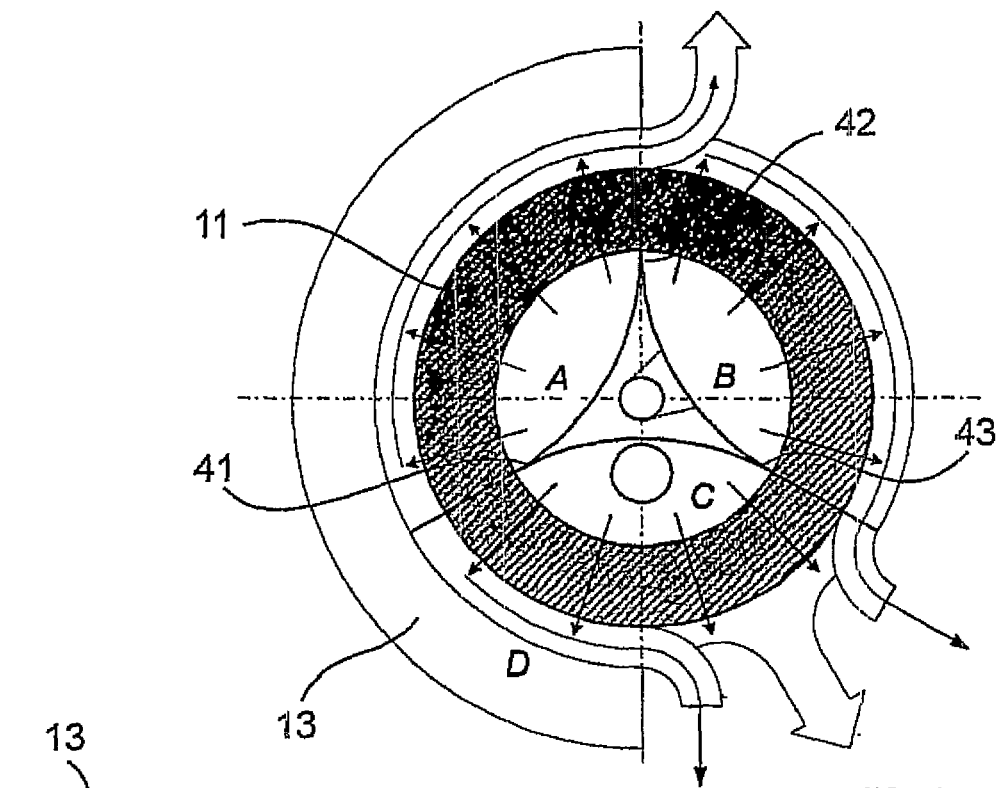
FIGS. 5A and 5B show two schematic views illustrating a first working mode of the device according to the invention.
Figure 5B:
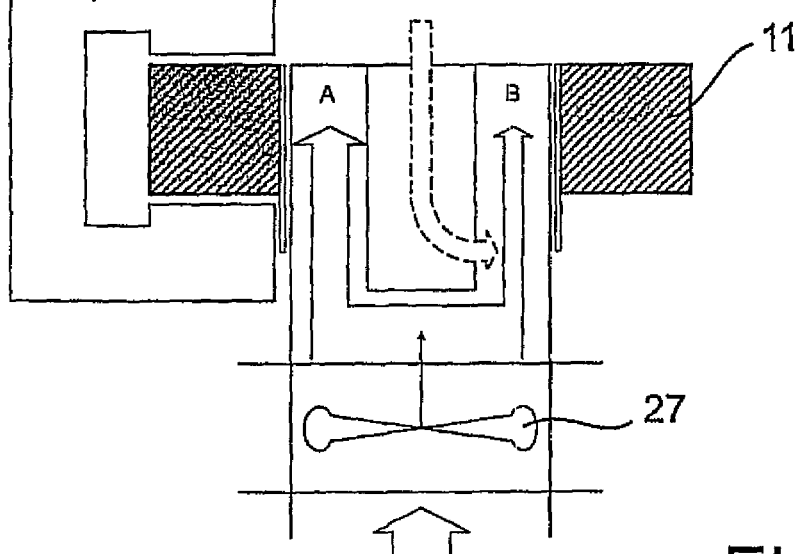

Below, the operation of the device illustrated in FIGS. 1, 2 and 3 will be described with reference to FIGS. 5A and 5B, whose purpose is to explain the general principle of how the device operates as a generator of cold in a first working mode. Two-thirds of the volume of air blown in by the fan 27 enters a first chamber A delimited by the partitions 41 and 42, and one-third of the volume blown in enters a chamber B delimited by the partitions 42 and 43. The volume of air in the inlet chamber A is injected into the transverse radial cavities 31 of the coaxial circular element 11, which contains for example spherical pellets of magneto-calorific material piled up so as to allow the air to pass through, and is then discharged into the ambient air. This is the air that has passed through the coaxial circular element 11 and been heated by the effect of the magnetic field on the magneto-calorific material. The air blown into the coaxial circular element 11 coming from the chamber B is collected at its outlet and blown into the chamber C. The air emerging from the coaxial circular element 11 coming from a first zone of the chamber C into the zone D is injected into the chamber B, where it is mixed with the air blown by the fan 27. The air from the coaxial circular element 11 coming from a second zone of the chamber C into the zone adjacent to the zone D constitutes the cooled air flow Fx used by the device acting as a generator of cold.

Figures 6A, 6B:
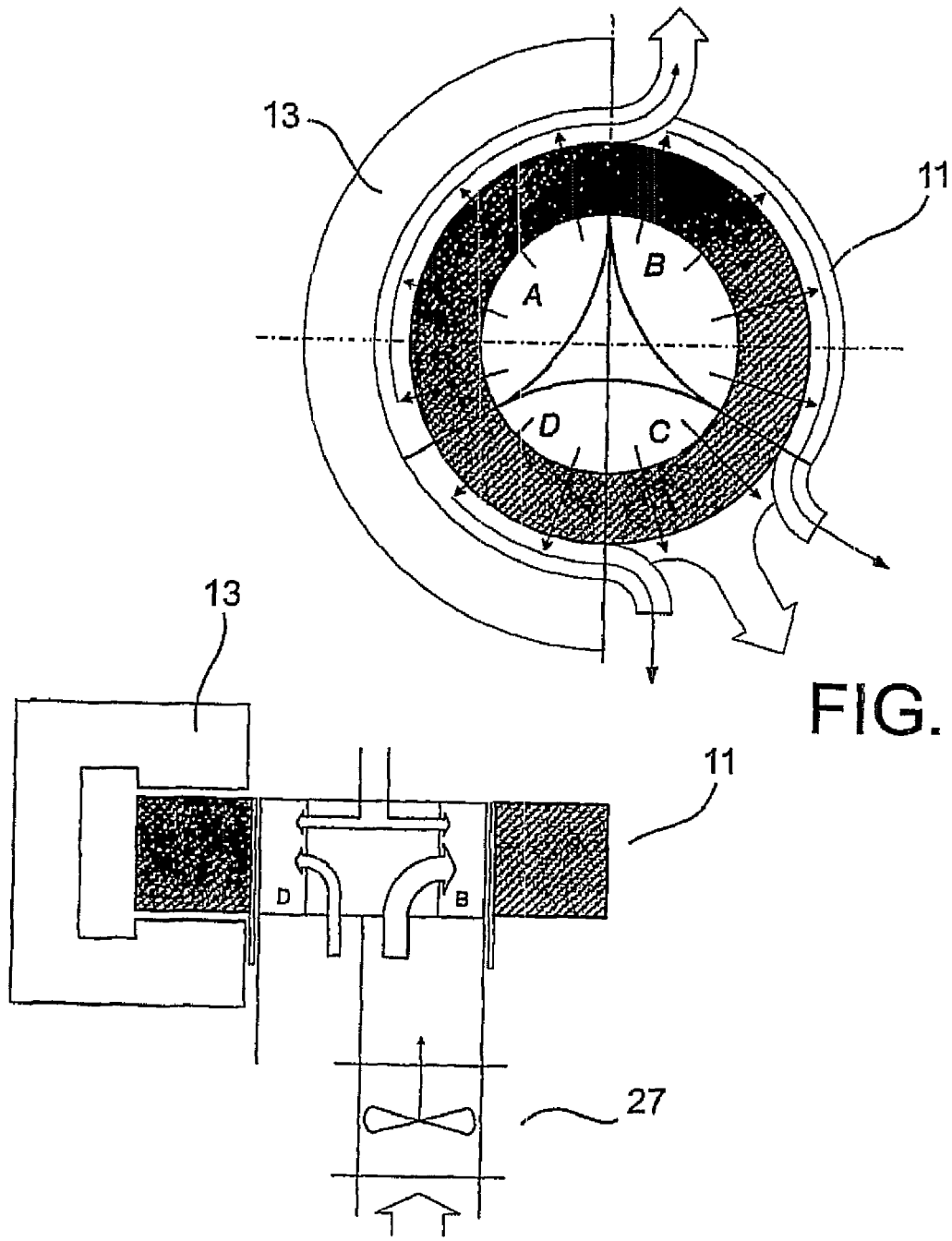
FIGS. 6A and 6B show two schematic views illustrating a second working mode of the device according to the invention.

In a second working mode illustrated in FIGS. 6A and 6B the fan 27 blows air only into the chamber B. The air that has passed through the transverse radial cavities of the coaxial circular element 11 is injected in equal proportions into the chambers A and C. The flow Fx of cooled air emerging from the sector C is collected and blown into a chamber to be cooled (not shown). From this cold chamber (not shown) a flow of outgoing cold air, the same as the air flow Fx entering the cold chamber, is collected and injected in equal proportions into the chambers B and D. Half of this air is mixed with the ambient air blown by the fan 27 into the chamber B. The other half of this air is mixed with the air in chamber A. Part, in this case half, of the air coming from chamber A, is blown into chamber D.

Figure 7A:
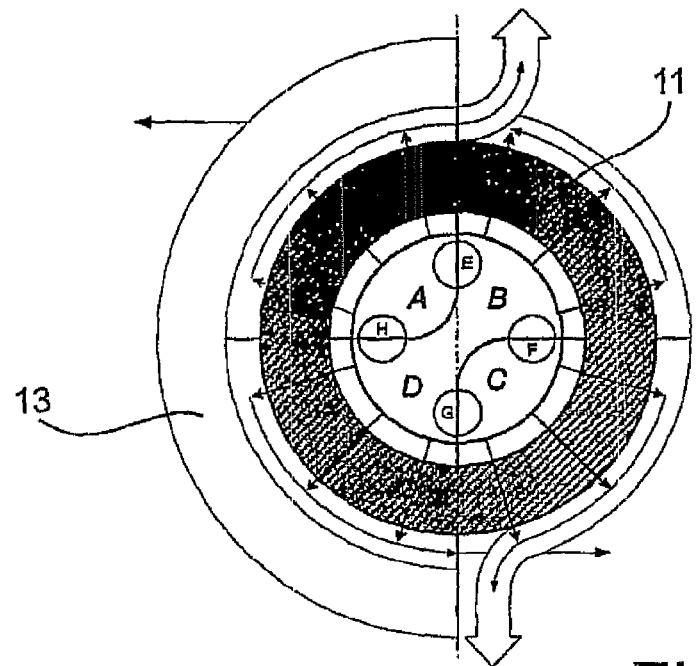
FIGS. 7A and 7B show two schematic views illustrating a third working mode of the device according to the invention.
Figure 7B:
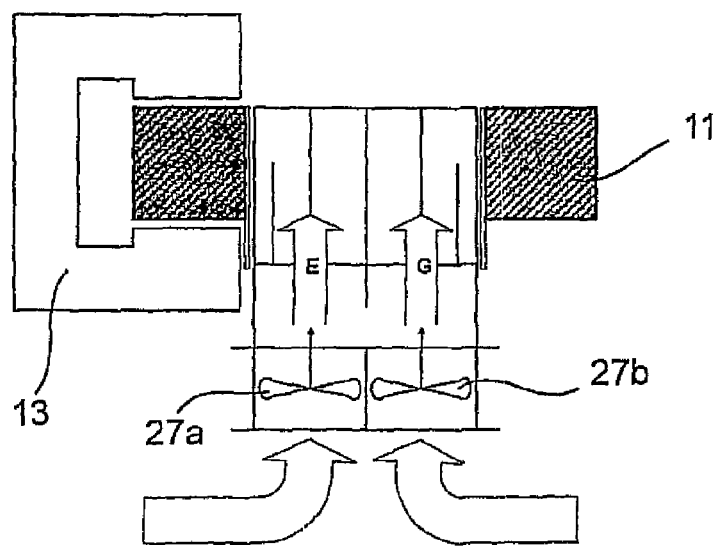

FIGS. 7A and 7B illustrate a third working mode in which the device is provided with two fans 27a and 27b and with four tubes E, F, G and H. The first fan 27a draws in ambient air or air from the sector A and propels it into the tube E. The other fan 27b draws in the air coming from the cold chamber (not shown) and propels it into the tube G. The air emerging from the four tubes E, F, G and H is divided equally between the four chambers A, B, C and D. The tubes F and H receive, respectively, air coming from the sectors D and B. The air emerging from sector C is injected into the cold chamber. Chambers B and D are connected and ideally the temperature is the same in these two chambers. By recovering the air from sector A, the system becomes totally closed.

Figure 8A:
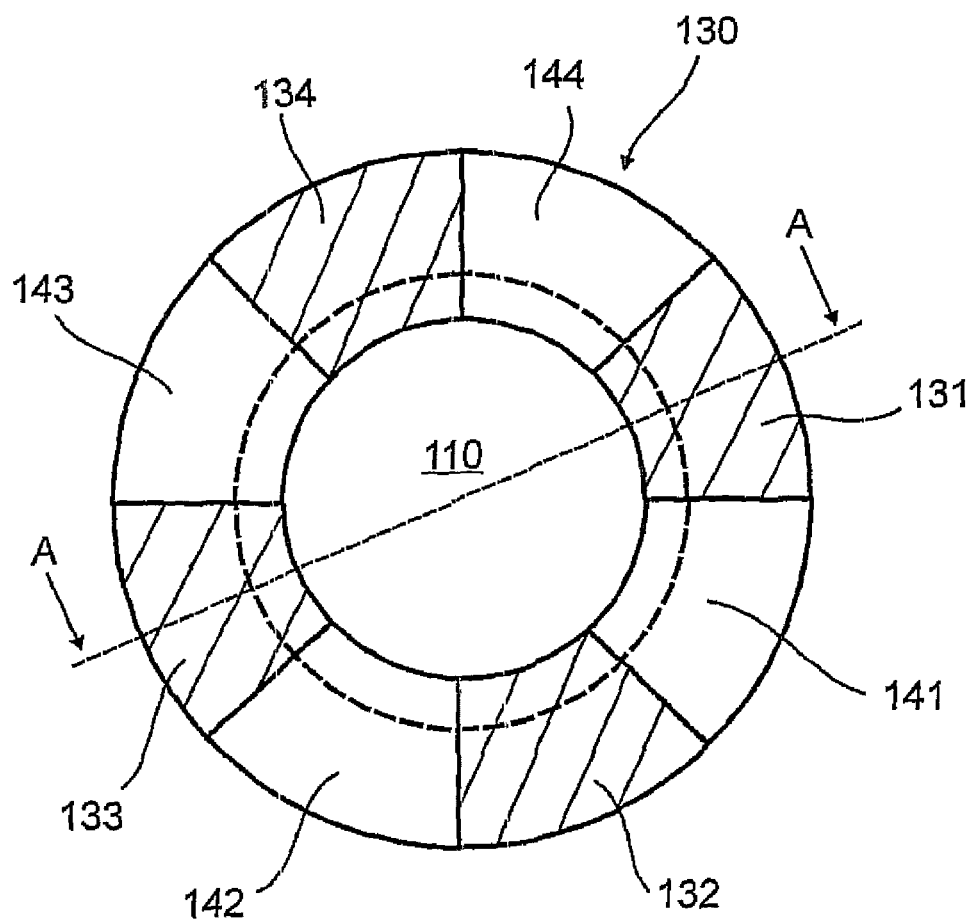
FIGS. 8A and 8B show two schematic views illustrating an advantageous embodiment of the magnetic field generator of the device according to the invention, FIG. 8B being a cross-section along the line A-A in FIG. 8A.
Figure 8B:
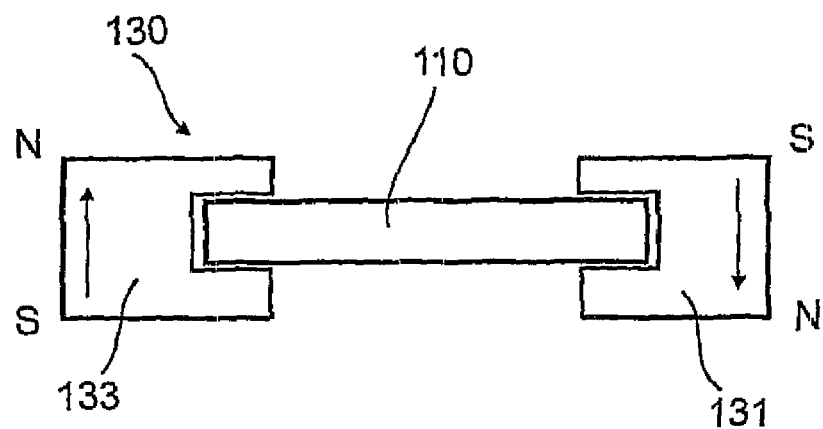

FIGS. 8A and 8B illustrate an embodiment of a magnetic field generator 130 which comprises four crown segment elements 131, 132, 133 and 134 separated respectively by four elements 141, 142, 143 and 144, in which no magnetic field generation means are arranged. A rotating circular element 110 is mounted so as to pass in alternation through the magnetic field zones and the zones with no magnetic field. It is advantageous to invert the magnetic poles of two segment elements, for example the segment elements 131 and 133, in which the north-south direction of the magnetic field is opposite for the two fields generated by these elements. The advantage of this design is that the attraction effects exerted on the rotating circular element 110 are balanced at all times, which simplifies the construction of the device and reduces the stresses on its moving parts.

The invention claimed is:

1. A device (10) for generating cold and heat by a magnetic effect, the device comprising: at least one magnetic field generator (13; 130) being arranged in at least one crown segment and defining an annular space through which passes a coaxial circular element (11), the circular element being provided with transverse radial cavities (31) and containing at least one magneto-calorific material, the transverse radial cavities being arranged so as to convey a heat-carrying fluid in contact with the magneto-calorific material; means for introducing the heat-carrying fluid in an axial direction into the coaxial circular element (11); means for introducing the heat-carrying fluid along a radial direction into the transverse radial cavities (31); the means for introducing the heat-carrying fluid in the axial direction into the coaxial circular element (11) and the means for introducing the heat-carrying fluid along the radial direction into the transverse cavities (31) comprising at least one fluid circulating element (27, 27a, 27b) arranged to circulate the heat-carrying fluid; at least one first collector (33) arranged to receive the heat-carrying fluid after passing through the transverse radial cavities (31) into a zone containing the magnetic field generator (13); and at least one second collector (34) arranged to receive the heat-carrying fluid after passing through transverse radial cavities (31) into a zone located outside the magnetic field generator (13) and the magnetic field generator (13; 130) is fixed and the coaxial circular element (11) with the transverse radial cavities (31) is rotated about an axis by a drive motor (M) which is mounted coaxially with the coaxial circular element (11).

2. The device according to claim 1, further comprising a means arranged to form a unit (40) which is arranged in series with at least one identical unit (50) to form a unit with greater power.

3. The device according to claim 1, wherein the heat-carrying fluid is a gas and the circulating element (27, 27a, 27b) of the heat-carrying fluid is a fan.

4. The device according to claim 1, wherein the magnetic field generator (13) is in a semicircular crown and comprises a steel core (14) and one of a C-shaped and a U-shaped cross-section in which permanent magnets (15) are supported so as to form a closed magnetic field.

5. The device according to claim 1, further comprising a supporting mechanical assembly (12) with a fixed inner bell (20) arranged coaxially inside a rotating outer bell (21) coupled to the drive motor (M), the rotating coaxial element (11) being attached to the rotating outer bell (21).

6. The device according to claim 5, wherein the fixed inner bell (20) and the rotating outer bell (21) are joined by ball bearings (22 and 23).

7. The device according to claim 5, wherein the fixed inner bell (20) and the rotating outer bell (21) form connection elements of the unit (40) and the identical unit (50).

8. The device according to claim 5, wherein the supporting mechanical assembly (12) comprises a plate (17), a belt (18), a fixed table (19) and the fixed inner bell (20).

9. The device according to claim 8, further comprising a lower cylinder (24) which, together with the belt (18) and the fixed table (19), delimits a lower space (25).

10. The device according to claim 9, wherein the lower space is divided mainly by three substantially radial partitions (41, 42, 43) and forms the means for introducing the heat-carrying fluid in the axial direction into the coaxial circular element (11).

11. The device according to claim 1, wherein the magnetic field generator (130) comprises an even number of magnetic elements in a form of crown segments, and the magnetic elements, two by two, form pairs and the magnetic elements of the same pair being diametrically opposite in relation to an axis of the magnetic field generator.

12. The device according to claim 11, wherein the crown segment elements of the same pair (131, 133; 132, 134) respectively generate magnetic fields of inverted polarity.

* * * * *